No. 794,222. PATENTED JULY 11, 1905.
S. H. HEGINBOTTOM.
AUTOMATIC AIR BRAKE FOR RAILWAYS.
APPLICATION FILED OCT. 13, 1904.
2 SHEETS—SHEET 2.
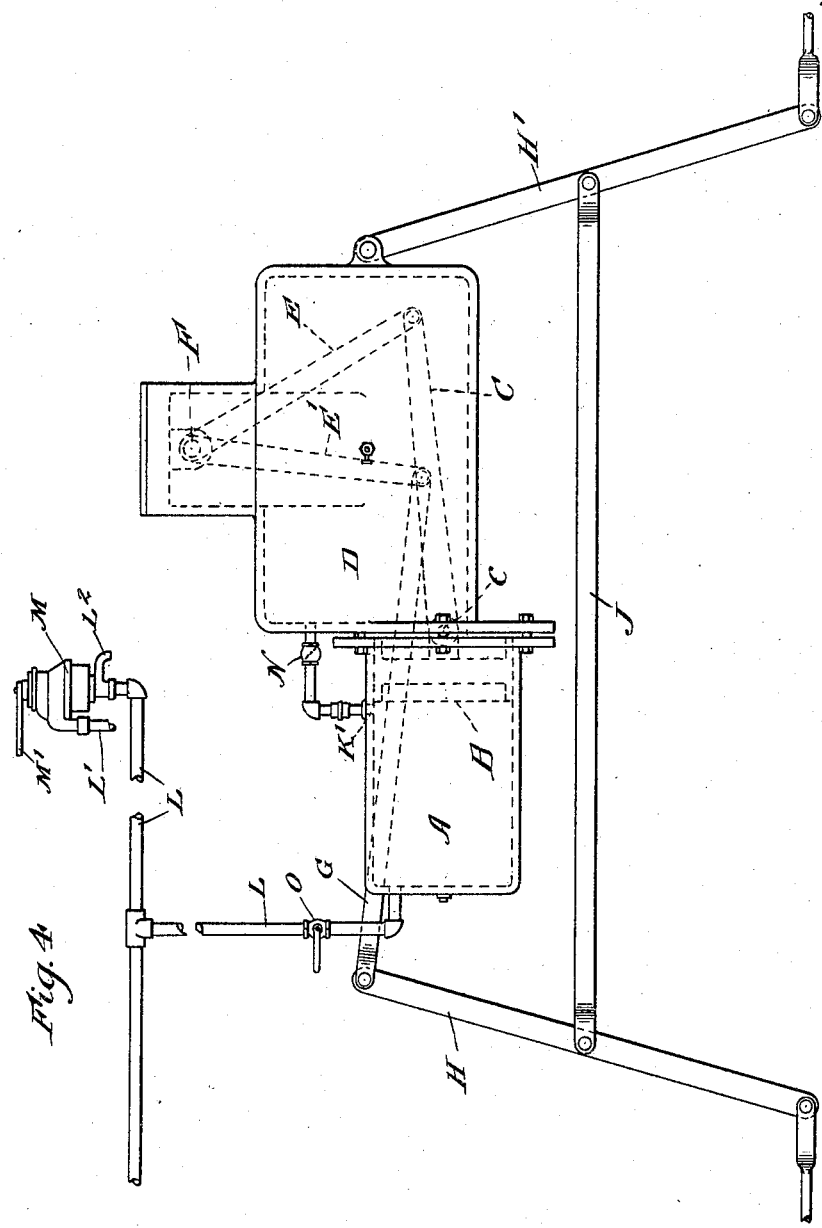
Witnesses:
Wm. Geiger
H. W. Munday
Inventor:
Samuel H. Heginbottom
By Munday, Evarts & Adcock
Attorneys No. 794,222.

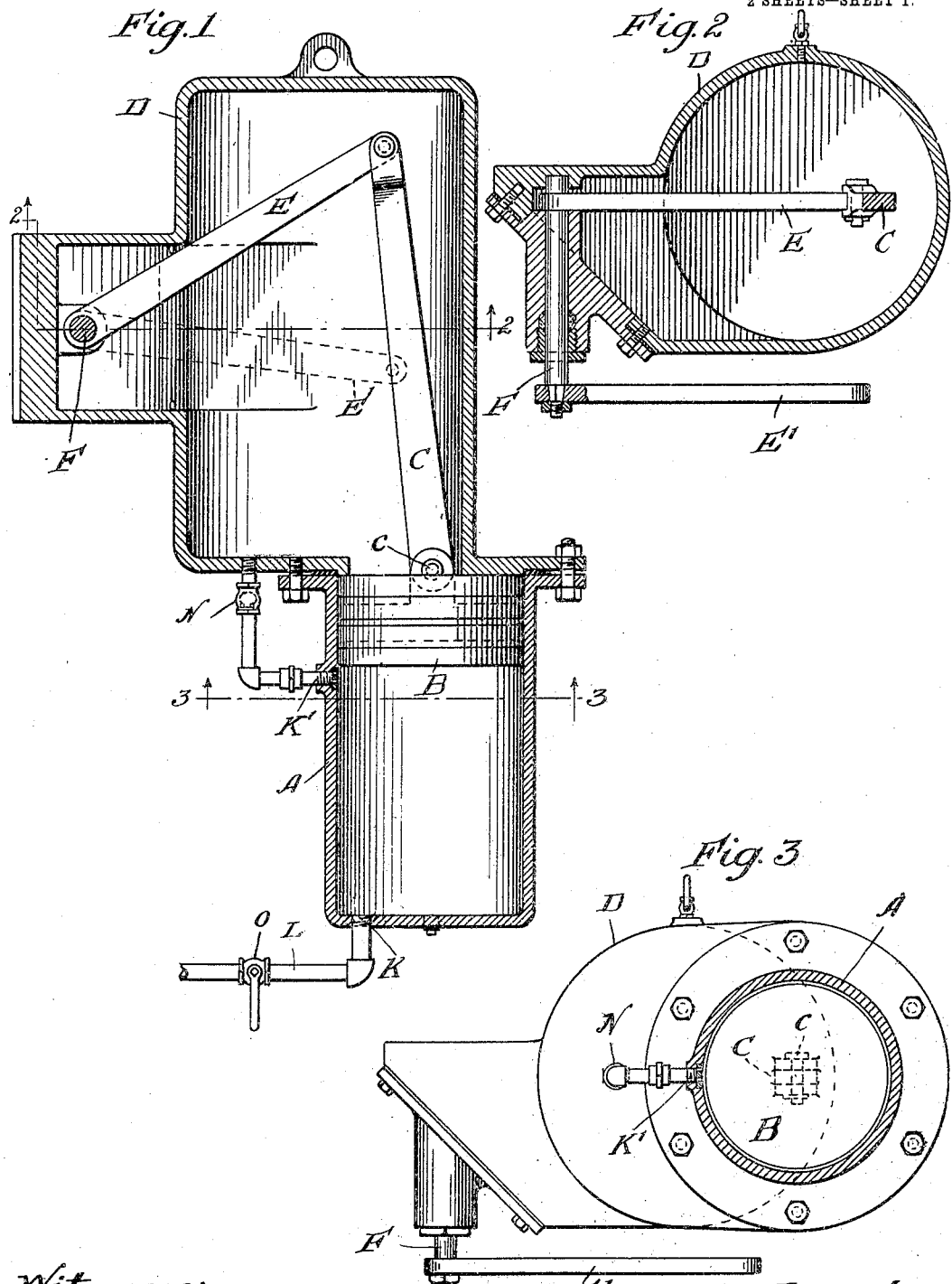

Patented July 11, 1905.

UNITED STATES PATENT OFFICE.

SAMUEL H. HEGINBOTTOM, OF SAGINAW, MICHIGAN, ASSIGNOR TO AMERICAN AIR BRAKE COMPANY, OF CHICAGO, ILLINOIS, A CORPORATION OF ARIZONA TERRITORY.

AUTOMATIC AIR-BRAKE FOR RAILWAYS.

SPECIFICATION forming part of Letters Patent No. 794,222, dated July 11, 1905.

Application filed October 13, 1904. Serial No. 228,266.

*To all whom it may concern:*

Be it known that I, SAMUEL H. HEGINBOTTOM, a citizen of the United States, residing in Saginaw, in the county of Saginaw and State of Michigan, have invented a new and useful Improvement in Automatic Air-Brakes for Railways, of which the following is a specification.

This invention relates to an improvement upon the form of air-brake shown and described in Patent No. 761,216, dated May 31, 1904, and granted to Flanders and Carlson, for automatic air-brakes for railways.

In the Flanders and Carlson air-brake the piston to which the air-brake is connected is operated to apply the brake by the pressure of air from an auxiliary reservoir connected, by means of a check-valve, with the cylinder containing the piston, and the special advantage of the device is the simplicity of the mechanism and the effectiveness of the brake operation, due to the fact that there is no escape for the air, the pressure of which applies the brake.

In the present invention the piston-rod of the Flanders and Carlson construction, which passes out through a stuffing-box in the end of the cylinder to the open air, is entirely dispensed with, and in place thereof a mechanical connection is made from the other side of the piston through the auxiliary chamber by means of a piston-rod, a crank-arm, and a rotatable packed shaft to the outer air and to the brakes. The advantage of this construction is that there is no chance for leakage from the cylinder or the auxiliary tank to the outer air except through the packing of the rotatable crank-shaft, which need have no sliding movement and which may be so perfectly packed that there can be no leakage whatever. There is also less friction between the rotary shaft and its bearings than between a sliding piston-rod and a stuffing-box. This absence of leakage means an automatic air-brake which when applied will stand so applied for any length of time desired without any loosening or yielding, and, moreover, the crank-arm form of connection from the piston to the brake-levers makes it exceedingly easy to apply an increasing pressure to the brakes by reason of a knee-lever action, so that as the brakes are applied to the wheels they move against the wheels slower and slower and with more and more power after the well-known manner of the knee-lever action.

In the accompanying drawings, forming a part of this specification, Figure 1 is a longitudinal sectional view of the brake-cylinder and its auxiliary reservoir. Fig. 2 is a cross-section on the lines 2 2 of Fig. 1, and Fig. 3 is a cross-section of the same on lines 3 3 of Fig. 1. Fig. 4 is a diagrammatic extension of the apparatus to illustrate better the mode of its operation.

In said drawings, A is a cylinder containing the piston-head B and the piston-rod C, the latter being pivotally connected to the piston B by the pivot $c$ and passing from said piston to the interior of the auxiliary reservoir D, where it is pivotally connected to the swinging arm E, the latter being attached to one end of the oscillatory shaft F, the other end of said shaft carrying the swinging arm E', connected by the link G with the brake-lever H, said brake-lever H being connected in turn by the link J to the brake-lever H'. Near the other end of the cylinder A is the port K, connected to the compressed-air piping L, the latter being constructed in the usual manner and connectible by a pipe L' with the usual compressed-air pump or its reservoir and by the pipe $L^2$ connectible with the outer air to exhaust. The usual three-way valve, indicated at M and having a handle M', is provided, so that the operator by turning said handle M' may admit compressed air into the piping L or open the exhaust $L^2$ or close the piping L against both admission and exhaust. Near the other end of the cylinder A and at a distance from said other end a little greater than the thickness of the piston B is the port K', always open for escape of air from the cylinder A when the piston B is at the extremity of its inward stroke. This port K' is piped through the check-valve N into the large air-reservoir D, said reservoir being preferably several times the dimensions of the cylinder A and communicating with the latter by an opening. Said reservoir is provided with the usual tap-cock or bleeder, and the port K should have a cut-off cock O.

The operation is as follows: Supposing the cock O to be open in the pipe L and the piston in the position indicated in the drawings, the brakes being withdrawn, compressed air is turned on to the piping L and passes through the port K into the cylinder and through the cylinder to the port K' and through the check-valve N into the reservoir D until the full pressure of the air stands equally in the pipes in the cylinder and in the reservoir. In this condition the brake system is charged and ready for operation. To apply the brake, the operator now turns the valve M in such position that the exhaust $L^2$ is opened, and thereby lowers the pressure in the pipe system and in the cylinder A, whereupon as the air cannot escape from the reservoir D because of the check-valve N the pressure of the air in said reservoir is brought to bear upon the piston B, and said piston is moved in such manner as to pull and swing the arm E, which motion is transmitted to the outside through the shaft F to the outer arm E' and thence by the link G to the brake-levers H H', and as the application of the power proceeds the levers E' and G move more and more nearly toward a straight line and a knee-lever action upon the brake therefore results. To release the brakes, the operator turns the three-way valve M in such position that the exhaust $L^2$ is closed and the inlet from the pipe L' is opened, so that the pressure of the air-pump or its reservoir is brought again into the piping L and through the port K into the cylinder A, where it will be greater upon the piston B than the back pressure from the reservoir D upon said piston, because it will be remembered that the air in the reservoir has already just expanded to produce the movement of said piston.

As indicated, the advantages of this apparatus consist in its simplicity and compactness of construction and the freedom from leakage and from the friction of sliding movements, as well as the advantage of the application of the brake-power by the knee-lever principle.

I claim—

1. In a brake system comprising a cylinder and piston, and an auxiliary air-chamber connected to the cylinder by a communication including a check-valve, the combination with said auxiliary air-chamber, cylinder and piston, check-valved communication, of a piston-rod extending from the cylinder toward the auxiliary chamber, and connected to an external member through the medium of a rotatable shaft extending from the interior of the auxiliary chamber to the exterior thereof, and said rotatable shaft, substantially as specified.

2. The combination with the cylinder A, the piston B, the auxiliary chamber D connected to the cylinder through a check-valve, the piston-rod C, the swinging arm E, the shaft F, the link G and the brake-lever whereby a knee-lever action is obtained, substantially as specified.

SAMUEL H. HEGINBOTTOM.

Witnesses:
　JAS. H. DAVITT,
　ELLA I. FEIGE.